Figure 1:
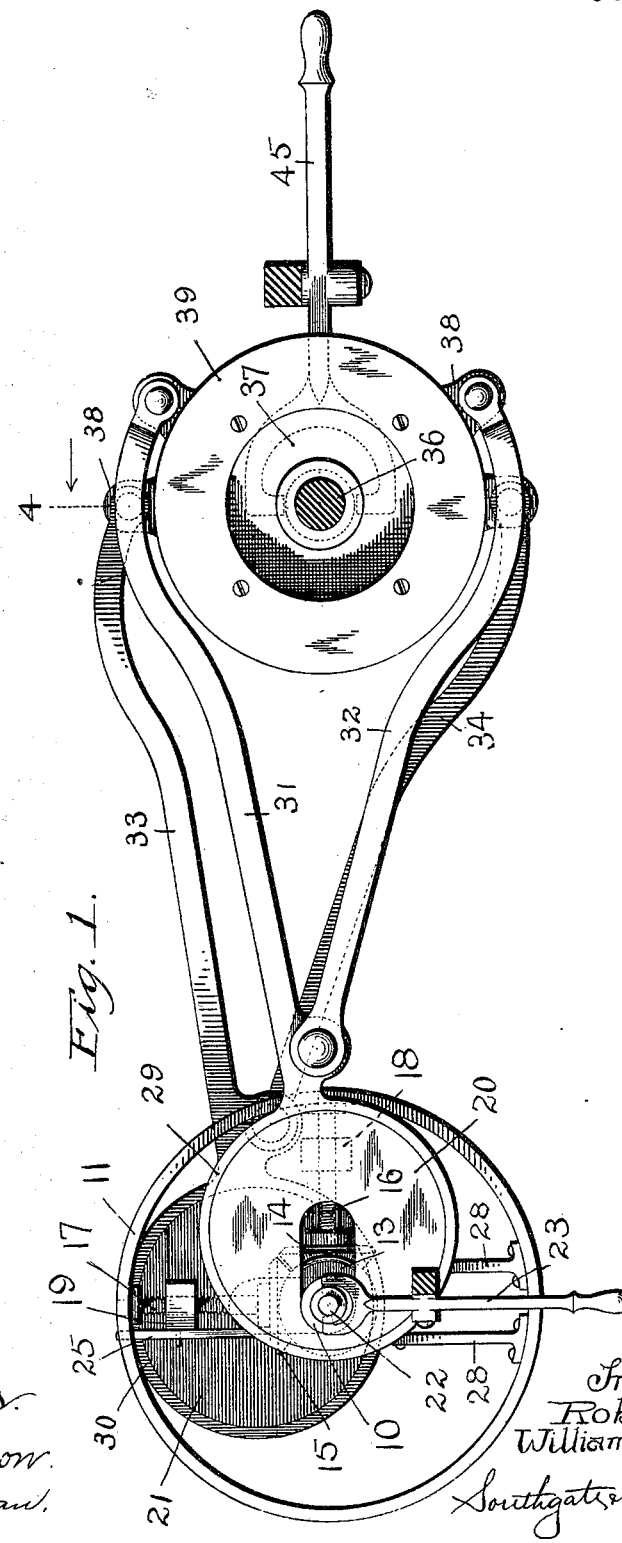

No. 669,499. Patented Mar. 12, 1901.
R. & W. T. ALDRICH.
VARIABLE SPEED DRIVING MECHANISM.
(Application filed May 18, 1900.)
(No Model.) 3 Sheets—Sheet 1.

Witnesses
C. F. Wesson.
M. E. Regan.

Inventors.
Robert Aldrich.
William T. Aldrich.
Southgate & Southgate
Attorneys.

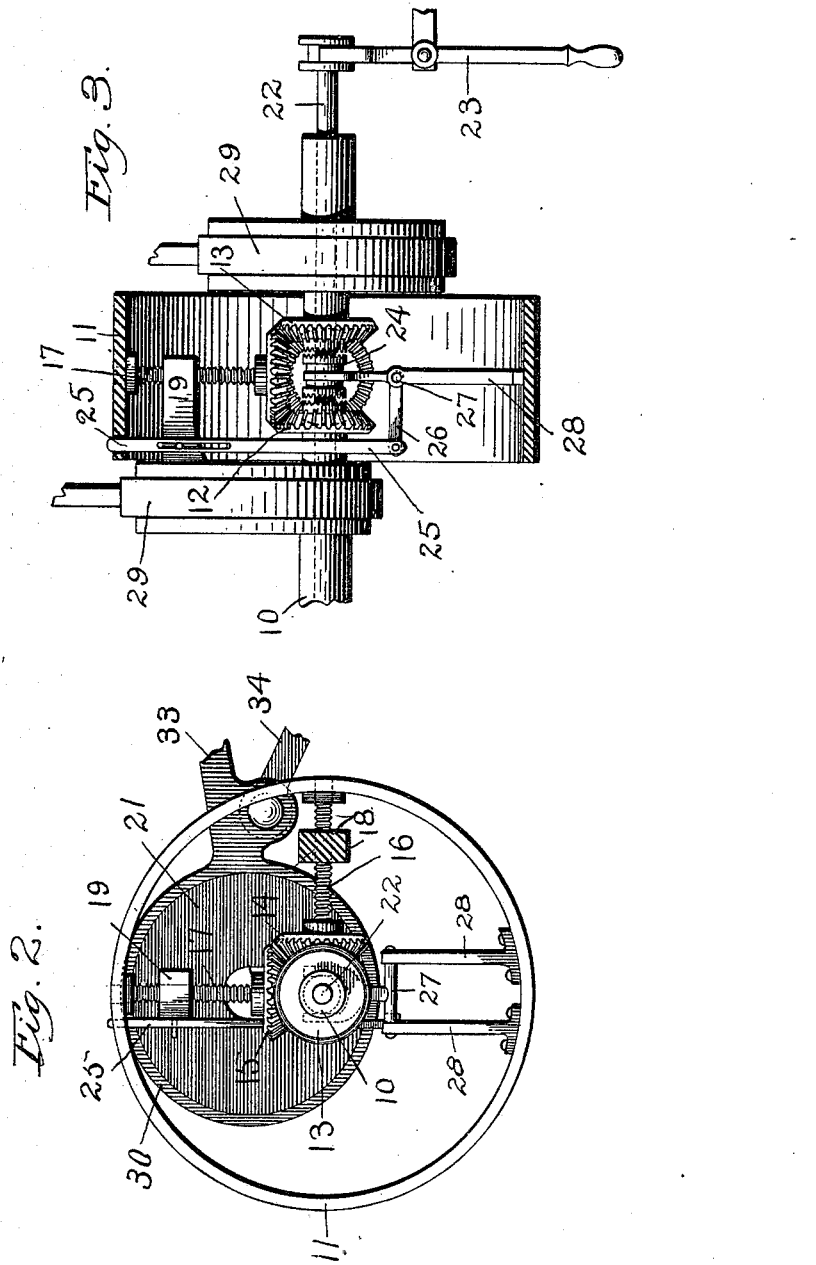

No. 669,499. Patented Mar. 12, 1901.
R. & W. T. ALDRICH.
VARIABLE SPEED DRIVING MECHANISM.
(Application filed May 18, 1900.)
(No Model.) 3 Sheets—Sheet 3.
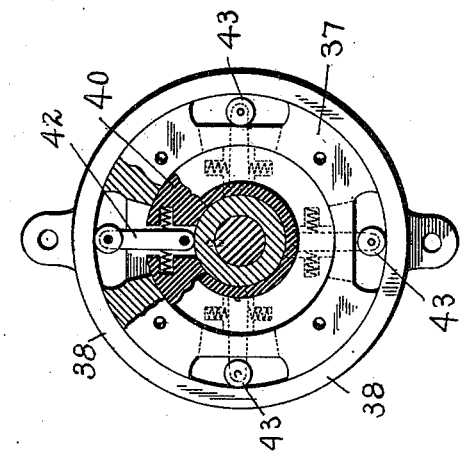
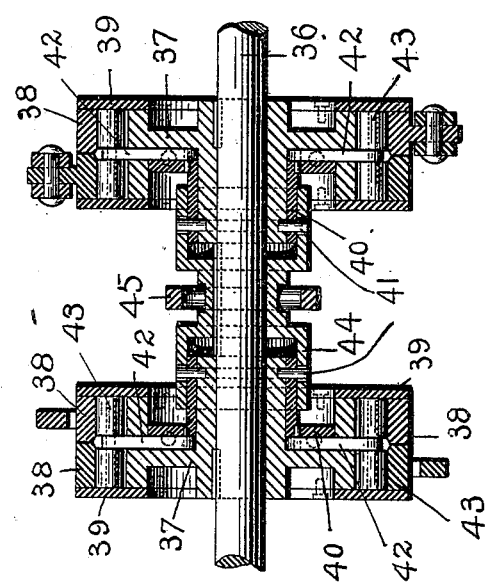
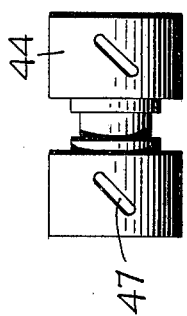
Witnesses.
C. F. Wesson.
M. E. Regan.
Inventors.
Robert Aldrich,
William T. Aldrich.
Southgate & Southgate
Attorneys.

UNITED STATES PATENT OFFICE.

ROBERT ALDRICH AND WILLIAM T. ALDRICH, OF MILLVILLE, MASSACHU-
SETTS, ASSIGNORS TO THEMSELVES, AND FRED L. CLEVELAND AND
GEORGE H. BAKER, OF WOONSOCKET, RHODE ISLAND.

VARIABLE-SPEED DRIVING MECHANISM.

SPECIFICATION forming part of Letters Patent No. 669,499, dated March 12, 1901.

Application filed May 18, 1900. Serial No. 17,082. (No model.)

*To all whom it may concern:*

Be it known that we, ROBERT ALDRICH and WILLIAM T. ALDRICH, citizens of the United States, residing at Millville, in the county of Worcester and State of Massachusetts, have invented a new and useful Variable-Speed Driving Mechanism, of which the following is a specification.

This invention relates to a mechanical movement for transmitting power from a driving-shaft to a driven shaft; and the object of this invention is to provide a simple, durable, inexpensive, and efficient power-transmitting mechanism which may be adjusted to secure any desired speed ratio between the speed of the driving-shaft and the driven shaft, the parts being arranged so that such adjustment may take place while the apparatus is in operation. To this end this invention consists of the variable-speed driving mechanism and the combinations of parts therein, as hereinafter described, and more particularly pointed out in the claims at the end of this specification.

In the accompanying three sheets of drawings, Figure 1 is a side view of a variable-speed driving mechanism constructed according to this invention. Fig. 2 is a detail view of the connections mounted on the driving-shaft, partly in section. Fig. 3 is a transverse sectional view thereof. Fig. 4 is a transverse sectional view of the roller-clutch which may be employed for receiving motion from the connections carried by the driving-shaft. Fig. 5 is a face view, partially in section, of the roller-clutch with the roller-retaining ring thereof removed; and Fig. 6 is a detail view of the operating-piece for wedging the clutch-rolls, so that the driven shaft will be turned forward or backward, as desired.

In numerous classes of machines it is desirable to provide connections which will turn a driven shaft at different relative speeds, and many different forms of connections have been devised for this purpose. A number of these prior variable-speed driving mechanisms have been objectionable because capable of producing only a limited number of speed variations and are incapable of producing either a gradual increase or decrease of the speed of the driven shaft, while other forms of variable-speed driving connections are objectionable, as they cannot be adjusted or varied while running.

The especial objects of our present invention are therefore to arrange the parts of a variable-speed driving mechanism so that they may be adjusted or varied without stopping the operation of the device and so that they may be controlled to produce either a gradual increase or decrease of the speed of the driven shaft without varying the speed of the driving-shaft. To accomplish this purpose, the driving-shaft of a variable-speed driving mechanism constructed according to our invention is provided with a plurality of crank-pins or eccentrics which are connected to turn the driven shaft—as, for example, through a clutch mechanism—and which may be simultaneously moved in or out to vary the speed of the driven shaft as may be required.

In certain forms of power-driven vehicles—as, for example, in an automobile which is driven by an explosive-engine or gas-engine—it is essential that the engine should run at constant speed during the use of the automobile and that some form of driving connection should be employed for transmitting variable speeds to the wheels. In a variable-speed driving mechanism constructed according to our invention the parts are arranged to form such a compact, light, and efficient construction that our variable-speed driving mechanism is especially adapted for use in automobiles, but is also capable of use for many other purposes.

Referring to the drawings and in detail, our variable-speed driving mechanism, as herein illustrated, comprises a driving-shaft 10, mounted on which is a pulley or rim 11. The web or spokes of the pulley or rim 11 are omitted in Figs. 1 to 3 for the sake of clearness, but may be arranged in any of the ordinary or preferred manners to connect the two sections of the driving-shaft 10. Journaled within the rim 11, substantially at right angles to each other, are adjusting-screws 16 and 17, which are threaded into nuts or arms 18 and 19, which carry the enlarged crank-pins or eccentrics 20 and 21. The adjusting-screws 16 and 17 are provided with bevel-gears 14 and 15, meshing with bevel-gears 12 and 13, which bevel-gears 12 and 13 are normally loose upon the driving-shaft 10. By means of this construction whenever either one of the adjusting-screws 16 or 17 is turned to move the eccentric or crank-pin mounted thereon in or out the other eccentric will be simultaneously shifted in or out to the same extent.

To secure the adjustment of the eccentrics or crank-pins and to shift them in or out, as desired, we preferably employ a rod 22, extending into the driving-shaft and longitudinally movable therein by means of a handle 23. The rod 22 carries a double-faced clutch-piece 24, as shown most clearly in Fig. 3. By means of this construction whenever the clutch-piece 24 is moved from its normal or central position either the bevel-gear 12 or the bevel-gear 13 will be locked or held from turning with the driving-shaft 10, so that when said driving-shaft is turned the adjusting-screws 16 and 17 will act to shift the eccentric in or out, as desired. When the eccentrics have been moved in or out to their limits of travel, it is desirable that the clutch-section 24 should be released or thrown out of engagement with either of the bevel-gears 12 or 13, so as to provide a safety device for preventing the parts from being broken or the threads of the screws from being stripped. To accomplish this purpose, the nut or arm 19 of the eccentric 21 is provided with a pin engaging a slot in an arm or link 25, as shown most clearly in Fig. 3. The arm or link 25 is connected at its end to an arm 26, extending from a rock-shaft 27, journaled in brackets 28. Extending up from the rock-shaft 27 is a yoke or fork engaging the double-faced clutch-piece 24, so that by means of this construction an automatic stopping device is provided for throwing out the eccentric-shifting connections whenever the eccentrics are at their inner or outer ends of travel.

Mounted on the adjustable crank-pins or eccentrics 20 and 21 are eccentric-straps 29 and 30, and extending rigidly from the eccentric-straps 29 and 30 are primary links 31 and 33. Pivotally connected to the primary links 31 and 33 are secondary links 32 and 34. These primary and secondary links are each connected to the movable sections of a suitable clutch mechanism for turning or rotating the driven shaft, and by employing a plurality of links arranged in this manner we have found in practice that the combined action of said links through the clutch mechanism will impart a substantially uniform rotary movement to the driving-shaft.

The details of the clutch mechanism which we prefer to employ are most clearly illustrated in the third sheet of drawings. As shown in this figure, 36 designates the driven shaft. Fastened on the driven shaft 36 are center clutch-pieces 37. Journaled on the center clutch-pieces 37 and held in place thereon by retaining-rings 39 are the movable clutch-pieces or clutch-rings 38. Interposed between the clutch-pieces 37 and 38 are rollers 43, which are journaled in spring-pressed arms 42, carried by sleeves 40. By means of this construction when the sleeves 40 are shifted or turned the clutch-rolls will be wedged between the clutch-sections. When the clutch-rolls occupy their normal or central position, as illustrated in Fig. 5, no connection will be established between the outer clutch-pieces and the center clutch-pieces and no motion will be imparted to the driven shaft. When the clutch-rolls are turned or wedged in one direction between the clutch-sections, a forward motion will be imparted to the driven shaft, and when the sleeve is turned to wedge the clutch-rolls in the opposite direction an opposite motion will be imparted to the driven shaft. To turn or actuate the sleeve carrying the clutch-rolls, we preferably employ an actuating-piece 44, as shown in Figs. 4 and 6, which turns with but is longitudinally movable upon the driven shaft 36. The operating-piece 44 is provided with cam-grooves 47, as most clearly illustrated in Fig. 6, and connecting the cam-grooves 47 are pins 41, carried by the sleeves 40, the pins 41 also preferably engaging grooves in the pieces 37 for holding the sleeves in place. The operating-piece 44 may be shifted or moved longitudinally by an operating-handle 45.

Many changes may be made in the construction of our variable-speed driving mechanism by those who are skilled in the art without departing from the scope of our invention as expressed in the claims, and variable-speed driving mechanisms of our invention, although especially adapted for use in automobiles, may be employed in many different places. We do not wish, therefore, to be limited to the form of construction which we have shown and described; but What we do claim, and desire to secure by Letters Patent of the United States, is—

1. The combination of a driving-shaft, a shaft to be driven, a plurality of crank-pins or eccentrics carried by the driving-shaft, connections therefrom for turning the driven shaft, a screw for adjusting each eccentric, means for simultaneously turning said screws by power to move the eccentrics in or out to vary the speed of the driven shaft, and means for stopping the rotation of said screws when the eccentrics are at their inner or outer limit of travel, substantially as described.

2. The combination of a driving-shaft, a shaft to be driven, a plurality of crank-pins or eccentrics carried by the driving-shaft, connections therefrom for turning the driven shaft, a screw for each eccentric, bevel-gears mounted on said screws, a pair of bevel-gears loosely mounted on the driving-shaft meshing with the gears of the screws, and means for holding either one of the loose bevel-gears stationary to simultaneously turn said screws, substantially as described.

3. The combination of a driving-shaft having crank-pins or eccentrics, a driven shaft, a clutch mechanism on the driven shaft comprising a central clutch-piece, outer movable clutch pieces or rings, rolls interposed between said clutch-pieces, a sleeve, spring-pressed arms in which the rolls are mounted extending from said sleeve, links connecting the eccentrics with the movable clutch-pieces, and means for turning the sleeve to wedge the clutch-rolls, substantially as described.

4. The combination of a driving-shaft, a shaft to be driven, a plurality of crank-pins or eccentrics carried by the driving-shaft, connections therefrom for turning the driven shaft, a screw for adjusting each eccentric, bevel-gears mounted on said screws, bevel-gears loosely mounted on the driving-shaft meshing with the bevel-gears of said screws, and a longitudinally-movable clutch-piece for holding either one of the loose bevel-gears stationary to simultaneously turn said screws, substantially as described.

5. The combination of a driving-shaft having crank-pins or eccentrics, a driven shaft, a clutch mechanism on the driven shaft comprising a center clutch-piece, outer movable clutch pieces or rings, rolls interposed between said clutch-pieces, a sleeve, spring-pressed arms in which the rolls are mounted extending from the sleeve, an operating-piece for said sleeve turning with and longitudinally movable on the driven shaft and having a cam-slot connection for turning said sleeve to wedge the clutch-rolls, and connections from said crank-pins or eccentrics to said clutch mechanism, substantially as described.

6. The combination of a driving-shaft, a shaft to be driven, a plurality of crank-pins or eccentrics carried by the driving-shaft, connections therefrom for turning the driven shaft, a screw for adjusting each eccentric, bevel-gears mounted on said screws, a pair of bevel-gears loosely mounted on the driving-shaft and meshing with the bevel-gears of the screws, a longitudinally-movable clutch-piece for holding either one of the loose bevel-gears stationary to simultaneously turn said screws, and means for simultaneously stopping the rotation of said screws, comprising a link having a lost-motion connection with one of said eccentrics and connected to turn a rock-shaft having a yoke for shifting said clutch-piece, substantially as described.

In testimony whereof we have hereunto set our hands in the presence of two subscribing witnesses.

ROBERT ALDRICH.
WM. T. ALDRICH.

Witnesses:
J. B. DAVIS,
EDNA I. NOLT.